United States Patent [19]

Lautenschläger et al.

[11] Patent Number: 5,676,487
[45] Date of Patent: Oct. 14, 1997

[54] CONNECTING HARDWARE

[75] Inventors: Horst Lautenschläger, Reinheim; Gerhard Lautenschläger, Brensbach-Wersau, both of Germany

[73] Assignee: MEPLA-Werke Lautenschläger GmbH & Co. KG, Germany

[21] Appl. No.: 666,337

[22] PCT Filed: Sep. 26, 1995

[86] PCT No.: PCT/EP95/03805

§ 371 Date: Jun. 20, 1996

§ 102(e) Date: Jun. 20, 1996

[87] PCT Pub. No.: WO96/14513

PCT Pub. Date: May 17, 1996

[30] Foreign Application Priority Data

Nov. 4, 1994 [DE] Germany .............. 44 38 919.1
Nov. 15, 1994 [DE] Germany .............. 44 40 726.2

[51] Int. Cl.$^6$ ................................ F16B 2/18
[52] U.S. Cl. ............... 403/231; 403/245; 403/407.1; 403/DIG. 8
[58] Field of Search .................. 403/231, 230, 403/245, 405.1, 407.1, 409.1, DIG. 8, 240, 314, 350

[56] References Cited

U.S. PATENT DOCUMENTS

| | | | |
|---|---|---|---|
| 4,509,882 | 4/1985 | Lautenschläger, Jr. | 403/231 X |
| 4,549,831 | 10/1985 | Lautenschläger, Jr. | 403/231 |
| 4,786,204 | 11/1988 | Mayeda | 403/DIG. 8 X |
| 5,403,109 | 4/1995 | Johnson et al. | 403/407.1 X |

FOREIGN PATENT DOCUMENTS

| | | | |
|---|---|---|---|
| 2445461 | 8/1980 | France . | |
| 2546750 | 4/1977 | Germany . | |
| 2546751 | 4/1977 | Germany | 403/231 |
| 9215845 | 2/1993 | Germany . | |

*Primary Examiner*—Harry C. Kim
*Attorney, Agent, or Firm*—Londa and Traub

[57] ABSTRACT

Connecting hardware for furniture parts, particularly of panel-shaped components of easily disassembled furniture. The connecting hardware includes a bolt which protrudes from one furniture part and can be introduced into a recess in the second furniture part. The bolt is held in a connecting position by a tensioning element provided in the recess and which engages the free end of the bolt, the bolt being held in a fastening bushing inserted in the first furniture part. The end section of the bolt is offset eccentrically to the center axis of the bolt and is disposed rotatably in an associated accommodating opening of the fastening bushing. The accommodating opening for holding the end section in turn is offset by the same amount eccentrically to the external diameter of the fastening bushing. The eccentricity of the end section and of the associated accommodating opening is selected so that the accommodating opening extends to the outside with formation of a slot-like opening in the fastening bushing. In the region of the end section of the bolt, in the specified fastening position of rotation of the bolt, at least one anchoring rib, which is sharpened blade-like and extends in the peripheral direction, is provided in the free-cut opening.

13 Claims, 3 Drawing Sheets

CONNECTING HARDWARE

BACKGROUND

The invention relates to connecting hardware for furniture parts, particularly for panel-shaped components of easily disassembled furniture, which are to be connected to one another, with a bolt, which protrudes from one of the furniture parts and can be introduced into a recess in the second furniture part, and with a tensioning element, which is provided in the recess in the second furniture part and engages the free end of the bolt, the bolt of a fastening bushing, inserted in a borehole, being held in the first furniture part.

Such connecting hardware is used to a large extent for the separable connection of outer walls or partitions of furniture to bottom or covering panels of wardrobes. In order to be able to brace the furniture parts, which are to be connected, permanently with one another by means of such connecting fittings, and also to be able to compensate, for example, for any shrinkage, which results from drying out and results in a loosening, it must be possible to realize means of tightening, with which tension can be exerted, by means of the tensioning element supported at the second furniture part, such as a tensioning eccentric, a screw or a tensioning wedge, on the bolt held in the first furniture part, so that the furniture parts are pulled together. At the same time, the tensioning forces, introduced into the bolt, attempt to pull the bolt out of the fastening borehole accommodating it. In order to cause the bolt to be held securely in the assigned furniture part, the bolts, which previously were screwed directly with a thread into the material of the furniture part, are screwed at the present time either into bushings, which are hammered in or pressed in and the diameter of which exceeds that of the borehole accommodating them, or into expansion bushings, which can be expanded like an expansion dowel by the screwing-in thread of the bolt itself, the bushings being produced preferably from plastic. In both cases, admittedly, an attempt is made to increase the resistance of the bushings to being pulled out by raising the peripheral ridges, which are saw-tooth-shaped in cross section. However, the strength, which can be achieved in this manner, is limited, particularly in furniture parts made from chipboard material. It may, for example, be observed, that in the course of time, when furniture parts, connected with the known connecting hardware, are assembled and disassembled repeatedly, the fastening borehole breaks open or tears out and the wardrobes in question can no longer be assembled after having been moved only a few times.

It is an object of the invention to improve, for connecting hardware of the type in question here, the mounting of the bolt, fastened in the first furniture part, in such a manner, that even repeated assemblies and disassemblies do not result in any damage to the furniture parts in the region of the fastening borehole; at the same time, however, simple and rapid assembly shall nevertheless be possible. Moreover, even after the connecting hardware is opened, it shall be possible to remove the protruding awkwardly shaped bolt without difficulties from the associated furniture part and to reinstall it once again later on.

SUMMARY OF THE INVENTION

Starting out from the connecting hardware of the initially-described type, this objective is accomplished pursuant to the invention owing to the fact that the end section of the bolt, which is to be held in the fastening bushing, is disposed eccentrically to the central axis of the bolt, so that it can rotate, in an accommodating opening of the fastening bushing and that the accommodating opening for the end section, which is to be held, is disposed offset by the same amount eccentrically to the external diameter of the fastening bushing. The eccentricity of the end section of the bolt and of the associated accommodating opening in the fastening bushing is selected so that the accommodating opening in the fastening bushing goes to the outside with the formation of a slot-like opening in the wall of the fastening bushing, and that at least one blade-like, sharpened, radially protruding anchoring rib, which extends in the peripheral direction, is provided in the region of the end section of the bolt in the opening, which is cut free in the specified fastening position of rotation of the bolt. By twisting the bolt and, with that, the eccentrically appended end section in the accommodating opening of the fastening bushing, it is thus possible either to twist the blade-like sharpened anchoring rib or ribs into the interior of the fastening bushing or to place them in the opening, where the anchoring ribs, protruding from the end section, then cut into the material of the surrounding fastening borehole in the furniture part. The anchoring rib or ribs, due to their blade-like construction, can penetrate into the surrounding material of the furniture part without the exertion of an impermissibly high torque even in the case of relatively large radial overhang. The thereby occurring reaction force, on the other hand, pushes the fastening bushing in the region opposite the opening firmly against the wall of the borehole. By turning the bolt back in such a manner that the anchoring rib or ribs are turned back once again into the fastening bushing, the positive holding, achieved by the anchoring ribs, and the additional frictional tightening in the borehole due to the reaction force are canceled once again and the bolt, together with the fastening bushing, can be disassembled without difficulties and without damaging the fastening borehole.

In an appropriate embodiment of the invention, the accommodating opening in the fastening bushing forms in the fastening bushing in a region oriented in a height position relative to the anchoring rib or ribs of the bolt a depression in the inner wall of the fastening bushing, which is dimensioned so that the anchoring rib or ribs can be taken up in the depression when the bolt is twisted.

The angle of rotation of the end section of the bolt in the fastening bushing is advisably limited to 180° in such a manner, that the anchoring rib is in the first rotational end position in the opening that has been cut and in the second rotational end position in the depression in the inner wall of the fastening bushing. The first rotational end position thus corresponds to the fastening position of the bolt, while the second rotational end position is the assembling/disassembling position.

At the end section of the bolt and in the fastening bushing, stop surfaces can be provided, which are in contact with one another in the first rotational end position and ensure that the anchoring ribs are in the specified fastening position precisely in the opening in the fastening bushing and cut to maximum depth into the wall of the associated borehole. On the other hand, the depression in the inner wall of the fastening bushing advisably is constructed so that the anchoring rib or ribs in the second rotational end position lies or lie against a limiting surface of the depression. The anchoring ribs, together with the limiting surface of the depression, then form the stop for the second rotational end position.

In order to install the bolt in the fastening bushing so that it cannot be lost, it is advisable to provide in each case a cross member, which extends in the peripheral direction, in the accommodating opening or at the end section of the bolt, which is mounted rotatably in the accommodating opening. The cross member positively engages a groove, which extends in the circumferential direction. The cross section of the bolt or of the accommodating opening is complementary to that of the cross member.

The fastening bushing in its fastening borehole in the furniture part can be prevented from turning along with the bolt owing to the fact that the fastening bushing is provided on its external surface with at least one protruding, strip-like protrusion, which extends parallel to the longitudinal axis of the bolt. Preferably, two or more strip like protrusions, offset in the circumferential direction are provided. Advisably, each strip-like protrusion has a cross section, which is sharpened blade-like radially to the outside so that, upon being introduced axially into the fastening borehole in the furniture part, it cuts somewhat into the material of the wall of the borehole.

Additionally, it is advisable to provide the outer surface of the fastening bushing with at least one and preferably several elongated protrusions, which, mutually offset to one another in height, extend in the circumferential direction and bring about an additional anchoring of the fastening bushing in the borehole. In this connection, it may advantageous if the protrusion or protrusions, extending in the circumferential direction, has or have a cross section, radially curved convexly to the outside. These protrusions are not intended to cut knife-like into the wall of the borehole, but should lead to a compaction or consolidation of the wall regions opposite to the protrusions.

The fastening bolt can be constructed in a well-known manner, so that, at its end region averted from the end section, it has a tightening head, which has a larger diameter and is joined to a neck section of comparatively smaller diameter. A turnlock fastener, which usually is cylindrical in plan view, grips the tightening head from below and is provided with a screw-shaped inner tightening surface, is used as tensioning element for such fastening bolts. For installing and dismounting the bolt in or from the corresponding borehole in the furniture part, a tool-holding recess in the form of a screwdriver slot, a slot for a Phillips screwdriver or also a depression, suitable for inserting an Allen wrench, is advisably provided in the free front surface of the tightening head.

Between the end of the neck section, which is averted from the tightening head, and the end section, which is rotatably held in the fastening bushing, the diameter of the bolt preferably is increased, as a result of which a centering section results, which is concentric with the neck section and which is dimensioned, for example, corresponding to the diameter of the borehole leading from the front surface of the second furniture part into the recess. By these means, the second furniture part is centered with respect to the first furniture part already when the bolt is introduced into this borehole. At the transition between this centering section and the end section, offset eccentrically to it, a front surface is then formed, which acts as a depth stop for the introduction of the fastening bushing into the associated borehole during the installation of the bolt, that is, when the next section is offset eccentrically with respect to the fastening borehole.

In order to intensify the reaction force, which arises when the bolt is twisted from the installing/dismantling position into the fastening position and expands the fastening bushing against the wall of the fastening borehole, it may be advantageous if sections are provided, which lie against one another two-dimensionally and are flattened, at the end section of the bolt, which is mounted so that it can rotate in the fastening bushing, and at the accommodating opening of the fastening bushing, which accommodates the end section. As it is being twisted into the fastening position, the fastening bushing is then pressed additionally against the wall of the fastening borehole by the conversion of the regions of the end section, which adjoin the flattening of the end section and are circular in cross section.

The fastening bushing once again is preferably constructed as an injection molded plastic part, although basically, it is also conceivable to produce it from metal.

BRIEF DESCRIPTION OF THE DRAWINGS

The invention is explained in greater detail in the following description of an embodiment in conjunction with the drawing, in which FIG. 1 diagrammatically shows in a sectional representation the connection between two panel-shaped furniture parts, which meet at right angles, by means of connecting hardware, which is constructed pursuant to the invention.

Figure 1:
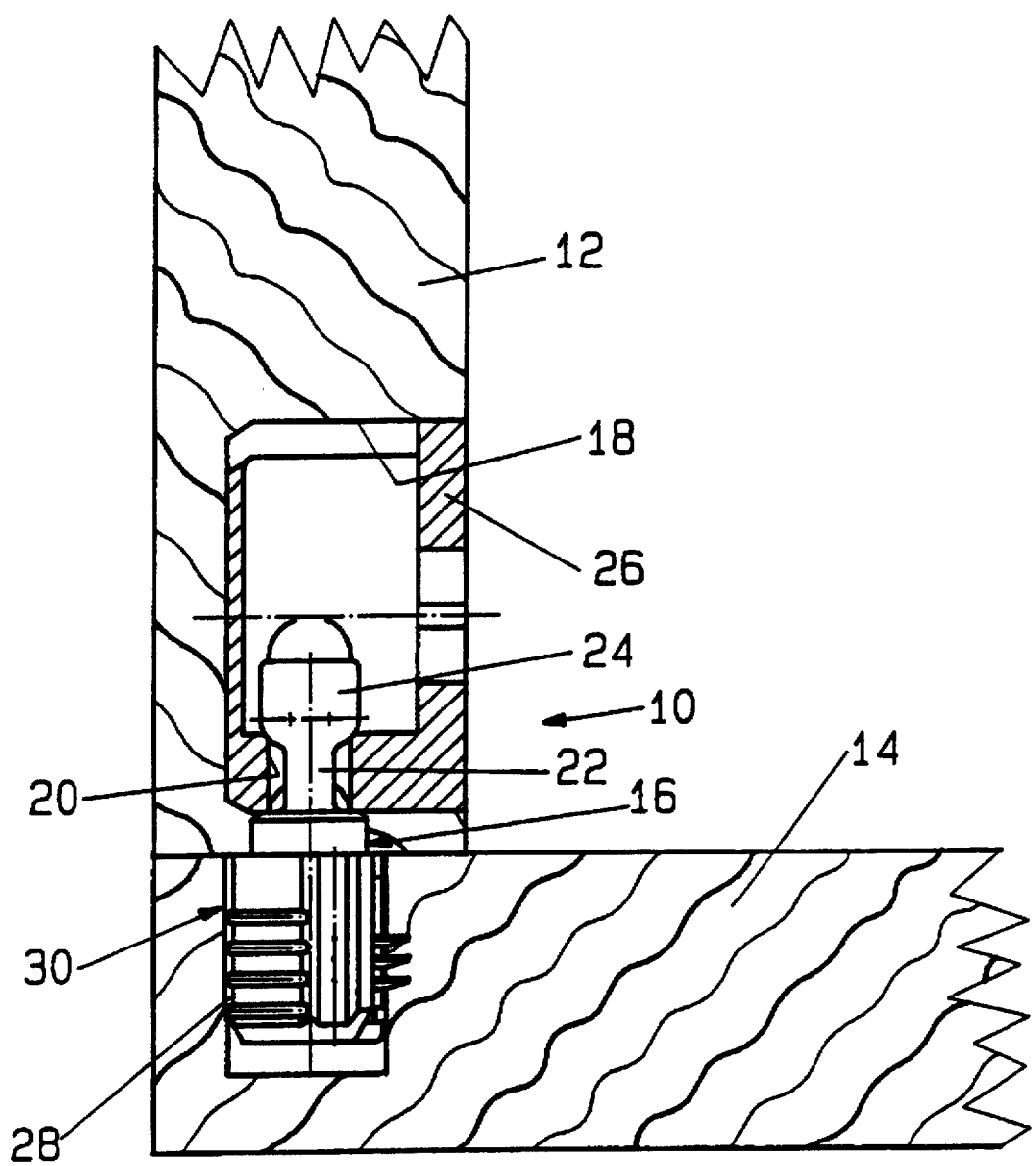
In FIG. 1, connecting hardware, which is labeled 10 as a whole, is shown diagrammatically in the specified connecting position of two panel-shaped furniture parts, for example, a side wall 12 of a wardrobe and a bottom 14 of a wardrobe, which meet at right angles. In the edge region of the bottom 14, a bolt 16 is fastened, which is taken through a borehole 20, which in plan view is a circular recess 18 which, starting from the inside, is milled from the leading edge of the side wall 12 as far as into the interior. Furthermore, at its end in the recess, the bolt 16 carries a tightening head 24, which is joined to a neck protrusion 22.
Figure 6:
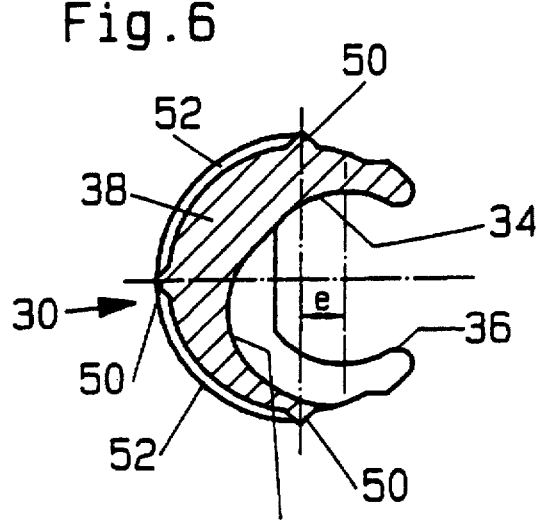
FIG. 6 shows a sectional view, as seen in the direction of the arrows 6—6 in FIG. 5.
Figure 2:
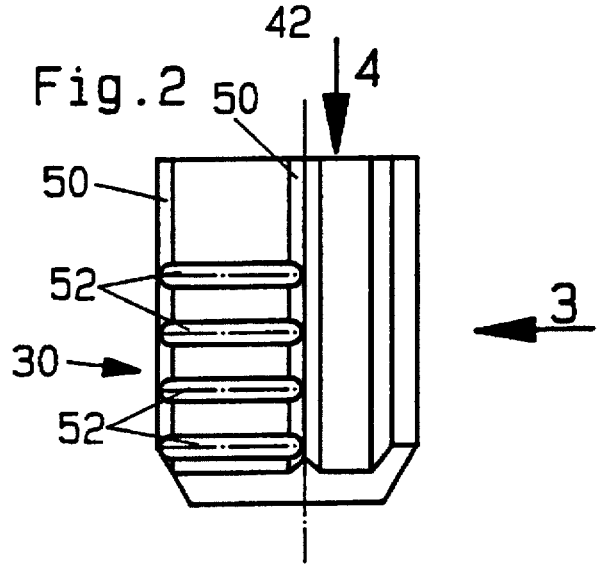
FIG. 2 shows a side view of the fastening bushing of the inventive connecting hardware.
Figure 3:
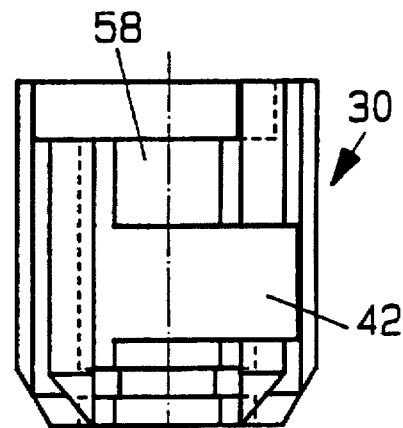
FIG. 3 shows a view of the fastening bushing as seen in the direction of arrow 3 in FIG. 2.
Figure 4:
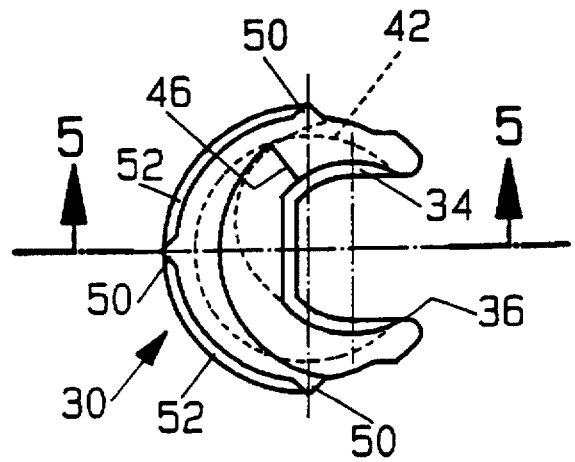
FIG. 4 shows a view of the fastening bushing as seen in the direction of arrow 4 in FIG. 2.
Figure 5:
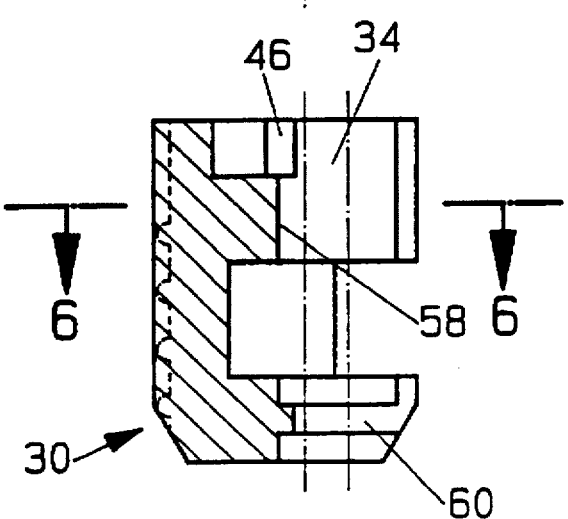
FIG. 5 shows a sectional view of the fastening bushing as seen in the direction of the arrows 5—5 in FIG. 4.
Figure 9:
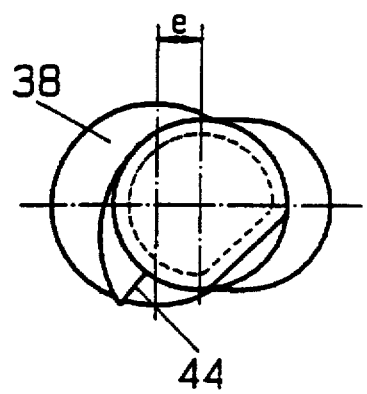
FIG. 9 shows a view of the bolt as seen in the direction of arrow 9 in FIG. 7.

The tightening head 24 lies in a well-known eccentric screw 26, which is disposed so that it can rotate in the recess 18 and closes it off in the direction of the inside of the wardrobe. The eccentric screw 26 grips below the tightening head 24 on both sides and, when twisted in the tightening direction, exerts an increasing tensile force on the bolt 16, which as a result applies tension between the bottom 14 and the leading edge of the side wall 12. In this respect, the connecting hardware basically does not differ from known connecting hardware.

On the other hand, deviating from this, the highly stressable but easily disassembled fastening of the bolt 16 to the bottom 14 is accomplished by means of a fastening bushing 30, which can be inserted in a fastening borehole 28 in the bottom 14. For this purpose, the fastening bushing 30, which is shown separately in FIGS. 2 to 6, and the end section 32 of the bolt 16 (FIGS. 7 to 11), held in the fastening bushing 30, are constructed in a special, mutually adapted manner.

The fastening bushing 30, produced by injection molding from a plastic, has an external shape, which is circular in plan view and essentially corresponds to the fastening borehole 28. However, the accommodating opening 34, which accommodates the basically cylindrical end section 32 of the bolt 16 so that it can be twisted, is offset by such an amount "e" eccentrically to its longitudinal, central axis, that it cuts through one side of the wall of the fastening bushing in slot fashion, so that a passage 36 results. The wall of the fastening bushing 30 is correspondingly thicker in the wall region 38 opposite the slot-like opening 36.

The end section 32 is offset by the same amount "e" eccentrically to the longitudinal axis of the bolt 16, so that, at the transition between the part of the bolt 16 entering the borehole 20 in the side wall 12 and the end section 32, a front surface 38 (FIGS. 7 to 9) is formed, which runs at right angles to the longitudinal axis of the bolt and forms a stop surface, which limits the depth of introduction into the fastening borehole 28 during the installation of the end section 32, accommodated so that it can rotate in the fastening bushing 30, in the fastening borehole 28.

In the case shown, three anchoring ribs 40, which are sharpened in blade fashion, extend in the peripheral direction and are at different heights, protrude from the peripheral surface of the end section 32. In the position of rotation of the bolt 16 in the fastening bushing 30, in which the eccentricity "e" of the end sections 32 of the bolt 16 points in the same direction as the eccentricity "e" of the fastening bushing 30, said anchoring ribs 40 are in the opening 36 and protrude there radially over the peripheral wall of the fastening bushing 30, which wall is completed into a full circle. In the specified fastening position of the connecting hardware 10 in the fastening borehole 28, the anchoring ribs 40 thus cut into the wall of the fastening borehole 28.

On the other hand, in the turned-back position of the end section 32 of the bolt 16 in the fastening bushing 30, the anchoring ribs 40 are placed in a depression 42 expanding the accommodating opening 34 in the region of the anchoring ribs, that is, they have receded into the interior of the fastening bushing 30. Since there is no anchoring in the wall of the fastening borehole 28 here, the bolt 16, together with the fastening bushing 30, can be pulled out of the fastening borehole. By adapting the size and position of the depression 42 to the position and dimensions of the anchoring ribs 40 at the end section 32, the anchoring ribs, together with the depression, also form a stop, which limits the twisting of the bolt 16 relative to the fastening bushing 30 in its final rotational position.

To limit the total path of rotation of the bolt 16 to no more than 180°—in the case shown to about 130°—in such a way, that the anchoring ribs 40 protrude by the desired radial measure from the opening 36 and cut into the wall of the fastening borehole 28, a radial stop surface 44, to which a stop surface 46 is assigned in the interior of the fastening bushing, is provided in the upper region of the end section 32 closely below the stepped surface 38 at a protrusion of the end section. The stop surfaces 44 and 46 thus lie against one another in the specified fastening position.

For the fastening of the end section 32 in the fastening borehole 28, the bolt must thus be turned out of the previously mentioned end position of rotation representing the installing/disassembling position into the twisted end position of rotation, which represents the fastening position. For this purpose, a tool-holding recess 48, constructed as an accommodating opening for a Phillips, screwdriver, is provided in the case shown in the free end surface of the tightening head 24 of the bolt 16. In order to ensure that, when the bolt 16 is twisted, the fastening bushing 30 does not twist along with the bolt, three protruding, strip-like protrusions 50, which run parallel to the longitudinal axis of the bolt, are provided at the outer surface of the fastening bushing 30 and are sharpened blade-like in cross section so that, upon being introduced into the fastening borehole 28, they dig with their blade somewhat into the material of the fastening borehole and thus reliably prevent the fastening bushing 30 being rotated when the bolt 16 is twisted.

In order to further improve the fixation of the bolt 16 in the fastening borehole by way of the positive holding of the anchoring ribs 40 in the surrounding wall of the borehole 28, care has been taken additionally to ensure that the reaction forces, arising during the penetration of the anchoring ribs 40 into the wall of the borehole, are transferred to the fastening bushing 30. By means of a number of extended protrusions 52 on the outside of the fastening bushing 30, which proceed in the circumferential direction and are offset in height relative to one another, the reaction force, arising when the anchoring ribs 40 are cut into the wall of the borehole, is used for the purpose of pressing the protrusions, which are convexly curved in cross section in the case shown, somewhat into the material of the wall of the borehole and, in this way, bring about an additional holding of the fastening bushing 30 to prevent its being pulled out.

To reinforce this reaction force, a flattening 56, 58 respectively is provided, on the one hand, in two regions of the end section 32 of the bolt 16, which lie opposite one another in the installed position and, on the other, in the accommodating opening 34 of the fastening bushing 30. In the installing/disassembling position, the flattenings 56 and 58 thus lie against one another. When the bolt 16 is twisted, the circular region of the end section 32 adjoining the flattening 56 then comes to lie against the flattening 58, as a result of which the end section 32 and the fastening bushing 30 are additionally thrust apart in a plane at right angles to the longitudinal axis of the bolt and are fixed in the fastening borehole 28.

For the pre-installation of the fastening bushing 30 on the end section 32 of the bolt 16, a cross member 60, which extends in the circumferential direction and to which an appropriate groove 62 is assigned in the end section 32 of the bolt, is provided in the lower end region of the accommodating opening 34. The cross member 60, engaging the groove 62, secures the bolt 16 additionally against being pulled out of the fastening bushing 30 in the longitudinal direction of the bolt.

Figure 8:
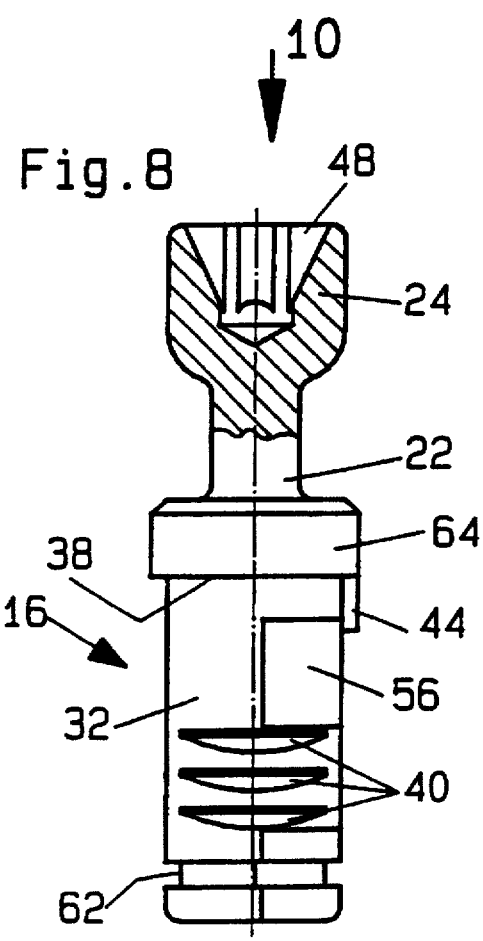
FIG. 8 shows a view of the bolt, partially cut in the upper end region, as seen in the direction of arrow 8 in FIG. 7.
Figure 7:
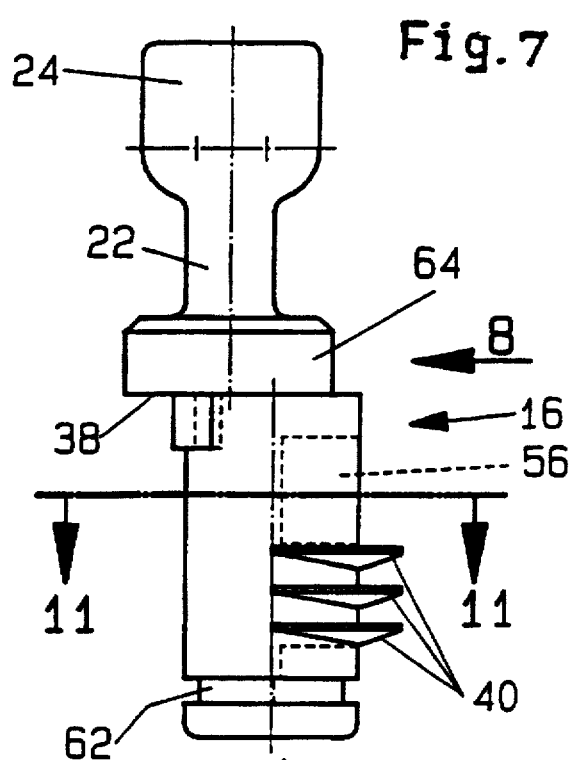
FIG. 7 shows a side view of the bolt, which is to be held in the fastening bushing of FIGS. 2 to 6.
Figure 10:
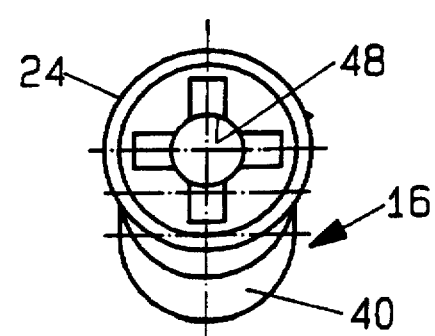
FIG. 10 shows a view of the bolt, as seen in the direction of arrow 10 in FIG. 8
Figure 11:
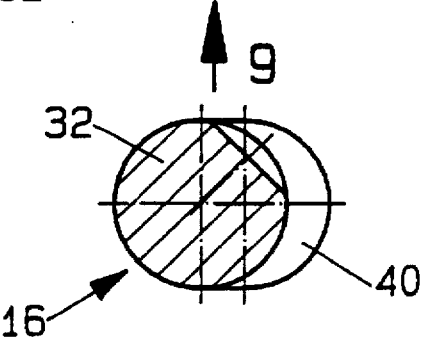
FIG. 11 shows a sectional view, as seen in the direction of the arrows 11—11 in FIG. 7.

Particularly in FIGS. 7 and 8, it can also be seen that, between the neck section 22 and the end section 32 of the bolt 16, a centering section 64 is provided, which is disposed concentrically to the neck section and has a diameter larger than that of the neck section. The diameter of the centering section 64 corresponds approximately to the diameter of the borehole 20, so that the protruding part of the bolt 16, when the latter is introduced into the fastening borehole 28, is aligned by the centering section 64 without clearance in the fastening borehole 28.

We claim:

1. Connecting hardware for furniture parts of easily disassembled furniture, comprising a bolt having one end section which is held by a fastening bushing which is insertable in a borehole in a first furniture part, said bolt having a free end which protrudes from the fastening bushing and is introducible into a tensioning element providable in a recess in a second furniture part which is to be connected with the first furniture part, said tensioning element being configured for engaging the free end of the bolt, wherein the end section of the bolt held in the fastening bushing, is offset eccentrically to a center axis of the bolt and is rotatably disposed in an accommodating opening of the fastening bushing, said accommodating opening for the end section of the bolt, is offset eccentrically to an external diameter of the fastening bushing by an amount equal to the offset of the end section, the eccentricity of the end section and of the associated accommodating opening is selected so that the accommodating opening cuts through the fastening bushing with formation of a slot-like opening in a wall of the fastening bushing and at least one blade-like sharpened, radially-protruding anchoring rib, extending in a circumferential direction, is provided in the region of the end section of the bolt in the specified fastening position of rotation of the bolt in the slot-like opening and wherein the accommodating opening in the fastening bushing, in a region level with the at lesat one anchoring rib, forms a depression in the wall of the fastening bushing which is dimensioned so that the at least one anchoring rib can be accommodated when the bolt is rotated into the depression, the rotation of the bolt in the fasterning bushing is limited to a maximum of 180° such that at least one anchoring rib are in the slot-like opening in a first rotational end position and in the depression in the wall of the fastening bushing in a second rotational end position, and wherein stop surfaces, which are mutually adjoining in the first rotational end position, are provided at the end section of the bolt and in the fastening bushing.

2. The connecting hardware of claim 1, wherein the depression in the wall of the fastening bushing is constructed so that the at least one anchoring rib lies against a limiting surface of the depression in the second rotational end position.

3. The connecting hardware of claim 1, wherein, a cross member is provided in the accommodating opening which extends in the circumferential direction for positive engagement with a groove at the end section of the bolt, while said bolt is rotatably mounted in the accommodating opening, said grove extending in the circumferential direction, said bolt also having a cross section in the end section of the bolt, which is complementary to that of the cross member.

4. The connecting hardware of claim 1, wherein the fastening bushing is provided on its external surface with at least one strip-like protrusion, which runs parallel to the longitudinal axis of the bolt and protrudes in strip-like fashion.

5. The connecting hardware of claim 4, wherein two or more strip-like protrusions are provided, which are disposed offset in the circumferential direction on the external surface of the fastening bushing.

6. The connecting hardware of claim 4, wherein the at least one protrusion has a cross section sharpened radially towards the outside in blade fashion.

7. The connecting hardware of claim 1, wherein the fastening bushing is provided on its external surface with one or more elongated protrusions, which extend in the peripheral direction and are offset to one another with respect to their height.

8. The connecting hardware of claim 7, wherein the protrusions, extending in the peripheral direction, have a radial cross section, which is curved convexly to the outside.

9. The connecting hardware of claim 1, wherein the bolt, at an end region averted from the end section, carries a tightening head of enlarged diameter, which is constructed at a neck section, the diameter of which is less than that of the tightening head.

10. The connecting hardware of claim 9, wherein a tool-holding recess is provided in a free front surface of the tightening head.

11. The connecting hardware of claim 9, wherein, between the end of the neck section, which is averted from the tightening head, and the end section, which is rotatably held in the fastening bushing, a centering section is provided, which has a larger diameter than the neck section and is disposed concentrically to the neck section.

12. The connecting hardware of claim 1, wherein, at the end section of the bolt, mounted rotatably in the fastening bushing, and at the accommodating opening accommodating the end section, flattened sections are provided, which lie two-dimensionally against one another in the specified installing/disassembling position of rotation.

13. The connecting hardware of claim 1, wherein the fastening bushing is constructed as an injection-molded plastic part.

* * * * *